United States Patent [19]

Tezuka et al.

[11] 4,449,505

[45] May 22, 1984

[54] INTERNAL COMBUSTION ENGINE

[75] Inventors: Etsuhiro Tezuka, Hamamatsu; Koichiro Kaji, Iwata; Toru Ichinose, Fukuroi, all of Japan

[73] Assignee: Yamaha Hatsudoki Kabushiki Kaisha, Iwata, Japan

[21] Appl. No.: 884,410

[22] Filed: Mar. 8, 1978

Related U.S. Application Data

[63] Continuation-in-part of Ser. No. 839,360, Oct. 4, 1977 and Ser. No. 854,260, Nov. 23, 1977, both abandoned.

[30] Foreign Application Priority Data

Mar. 12, 1977 [JP] Japan .................................. 52-27429

[51] Int. Cl.³ ........................ A02B 15/00; F02B 13/00
[52] U.S. Cl. ................ 123/432; 261/23 A; 123/579
[58] Field of Search ............. 123/75 B, 119 A, 119 B, 123/119 D, 119 DB, 30 C, 26, 124 R, 127; 261/23 A, 23 B, 39 D

[56] References Cited

U.S. PATENT DOCUMENTS

| | | | |
|---|---|---|---|
| 2,121,920 | 6/1938 | Mallory | 123/75 B |
| 2,484,009 | 10/1949 | Barber | 123/32 ST |
| 2,804,862 | 9/1957 | Nedwidek | 123/191 M |
| 3,154,059 | 10/1964 | Witzky et al. | 123/75 B |
| 3,171,395 | 3/1965 | Bartholomew | 123/127 |
| 3,364,911 | 1/1968 | Baudry et al. | 123/75 B |
| 3,495,809 | 2/1970 | Elam | 261/23 A |
| 3,673,997 | 7/1972 | Sawada | 123/119 B |
| 3,908,618 | 9/1975 | Tange et al. | 123/75 B |
| 4,018,193 | 4/1977 | Klomp | 123/30 C |
| 4,020,808 | 5/1977 | Yagi et al. | 123/119 A |
| 4,060,062 | 11/1977 | Tsutsui et al. | 123/75 B |
| 4,077,363 | 3/1978 | Noguchi et al. | 123/75 B |

*Primary Examiner*—Ira S. Lazarus
*Assistant Examiner*—Magdalen Moy
*Attorney, Agent, or Firm*—Ernest A. Beutler

[57] ABSTRACT

Several embodiments of internal combustion engines offering improved performance in the form of improved fuel economy and reduction in the emission of unwanted exhaust gas constituents at idle and low speed operation. In each embodiment, an induction system is employed using a main intake passage and a sub-intake passage, each of which communicates with the combustion chamber through a respective port. The sub-intake passage has a substantially smaller cross-sectional area than the main intake passage so that a given mass flow through this passage will enter the combustion chamber at a higher velocity than that flowing through the main intake passage. Throttle valve means are provided for sequentially controlling the flow into the combustion chamber through the main and sub-intake passages. This throttle valve means causes substantially all of the intake air flow at idle to pass through the sub-intake passage to promote high velocity induction and, at least in some embodiments, controlled swirl to the intake gases. This has been found to greatly improve combustion at idle and low speeds. In some embodiments of the invention, separate charge forming devices are employed for each of the induction passages, in the form of main and sub-carburetors. In other embodiments of the invention, the charge is supplied by a fuel injection nozzle that discharges into the main induction passage. In certain embodiments the sub-intake passage is oriented so as to generate a swirl in the combustion chamber which is maintained during the compression stroke. This swirl is obtained by directing the sub-intake passage port at the intake valve in such a way that the intake valve deflects the flow of the intake gases in a swirling motion. As a further feature, in certain embodiments other gases generated by the operation of the vehicle, such as evaporative fuel gases, crank case discharge products or a portion of the exhaust gases are introduced into the combustion chamber through the sub-intake passage.

55 Claims, 10 Drawing Figures

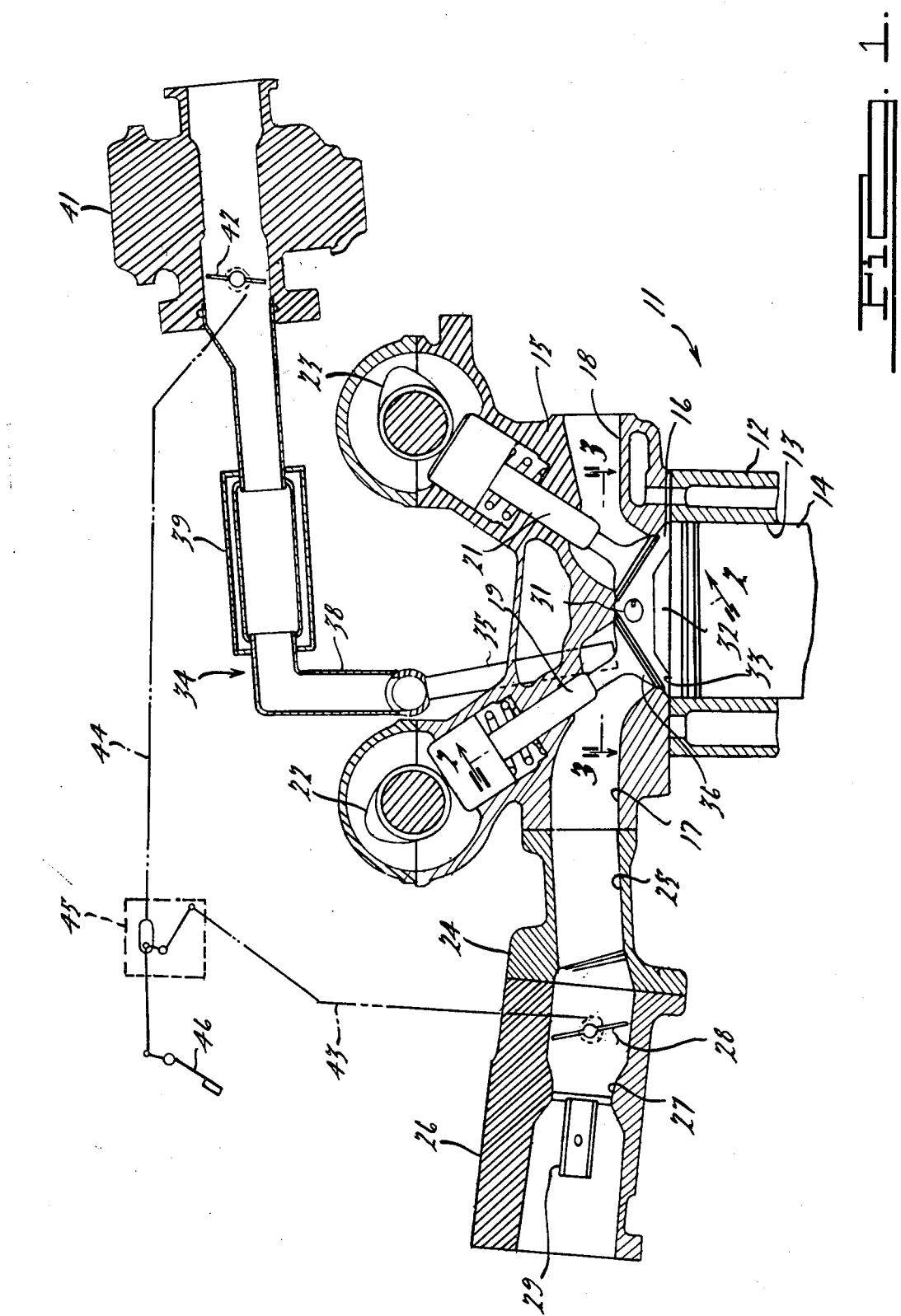

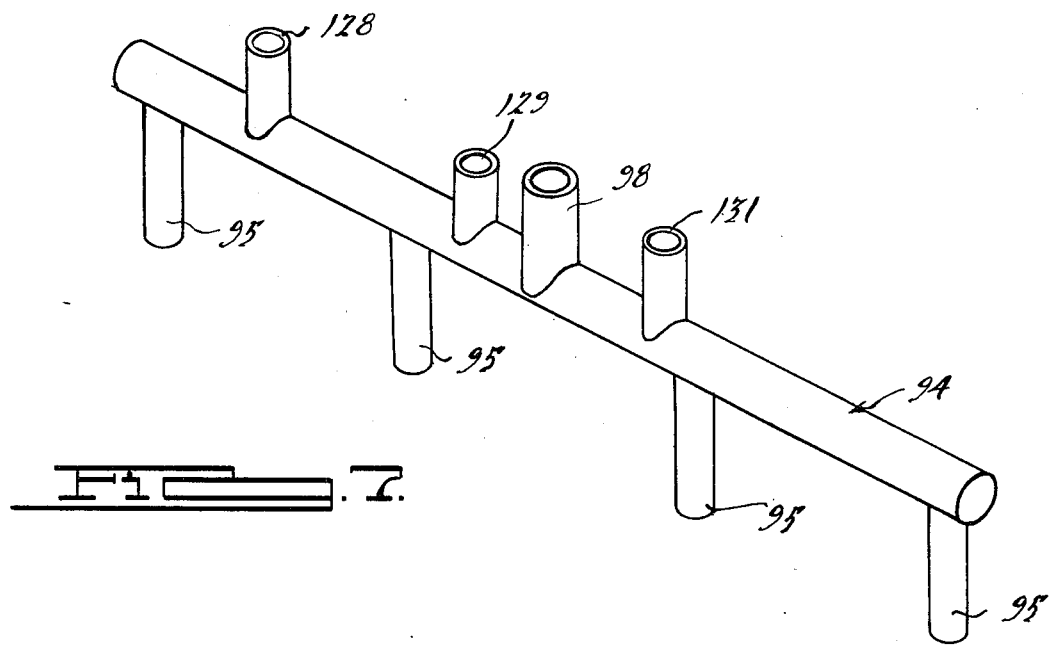
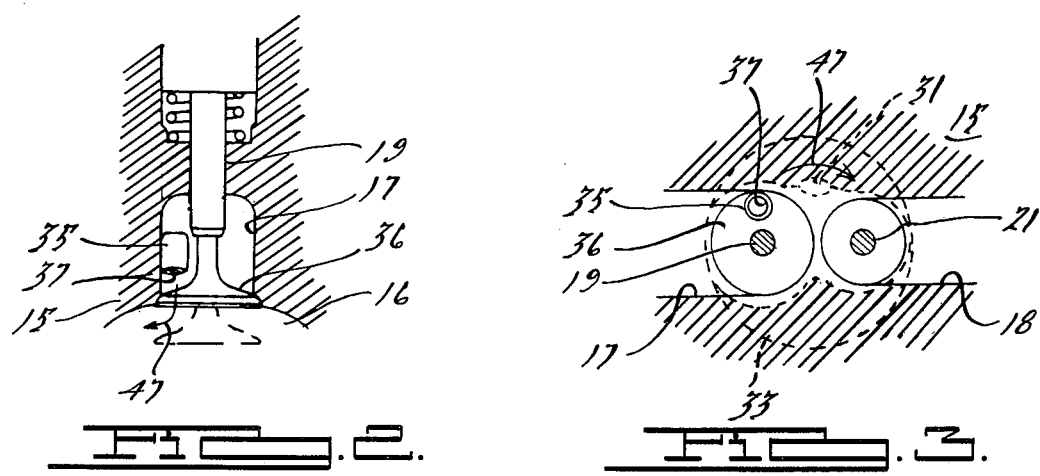
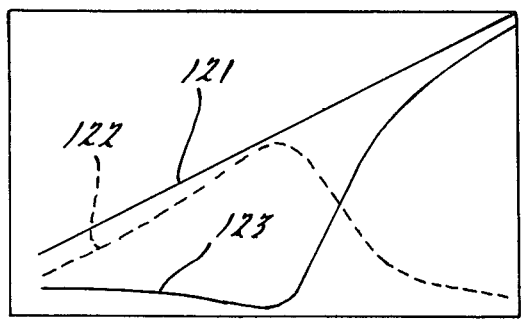

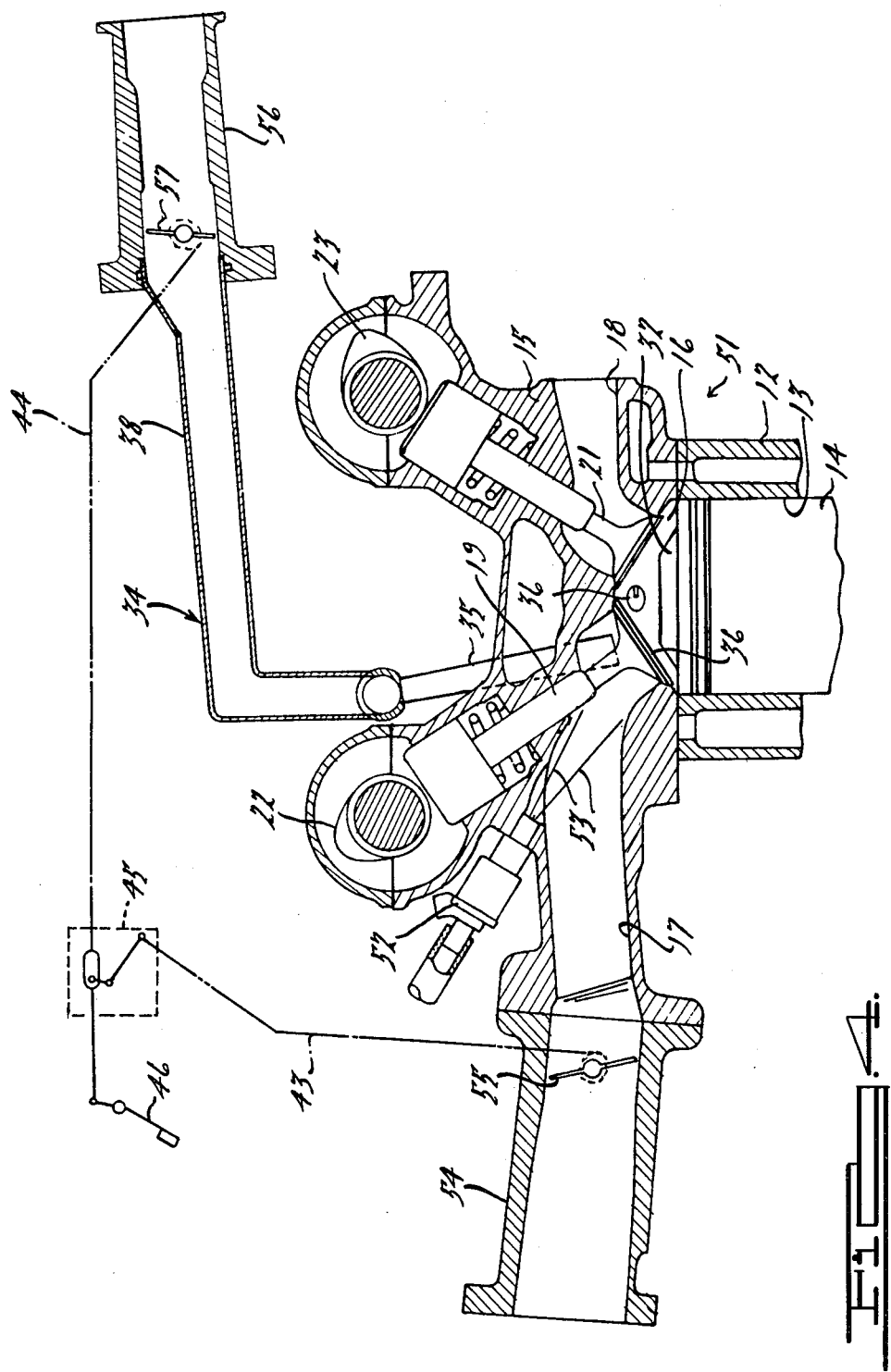

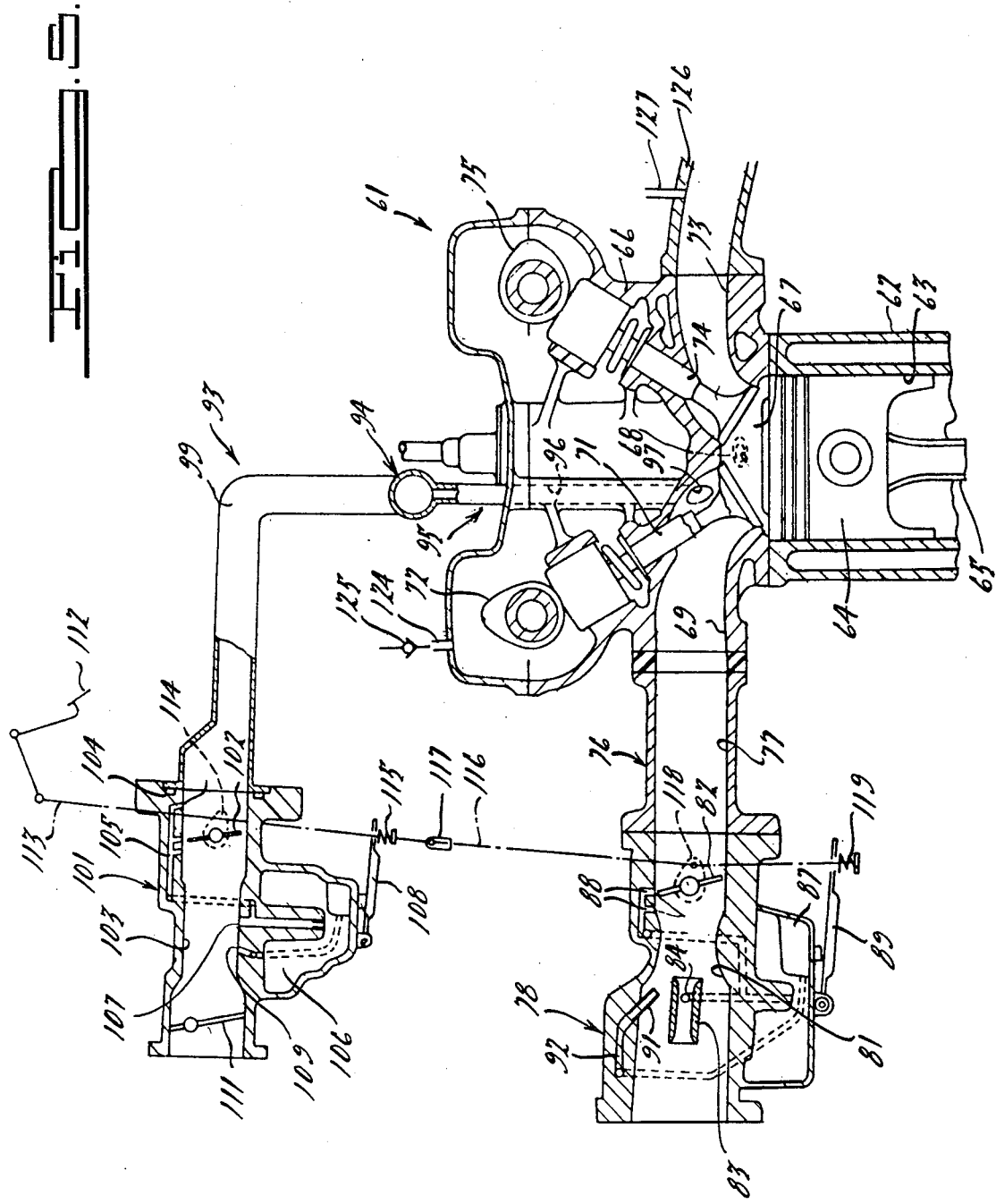

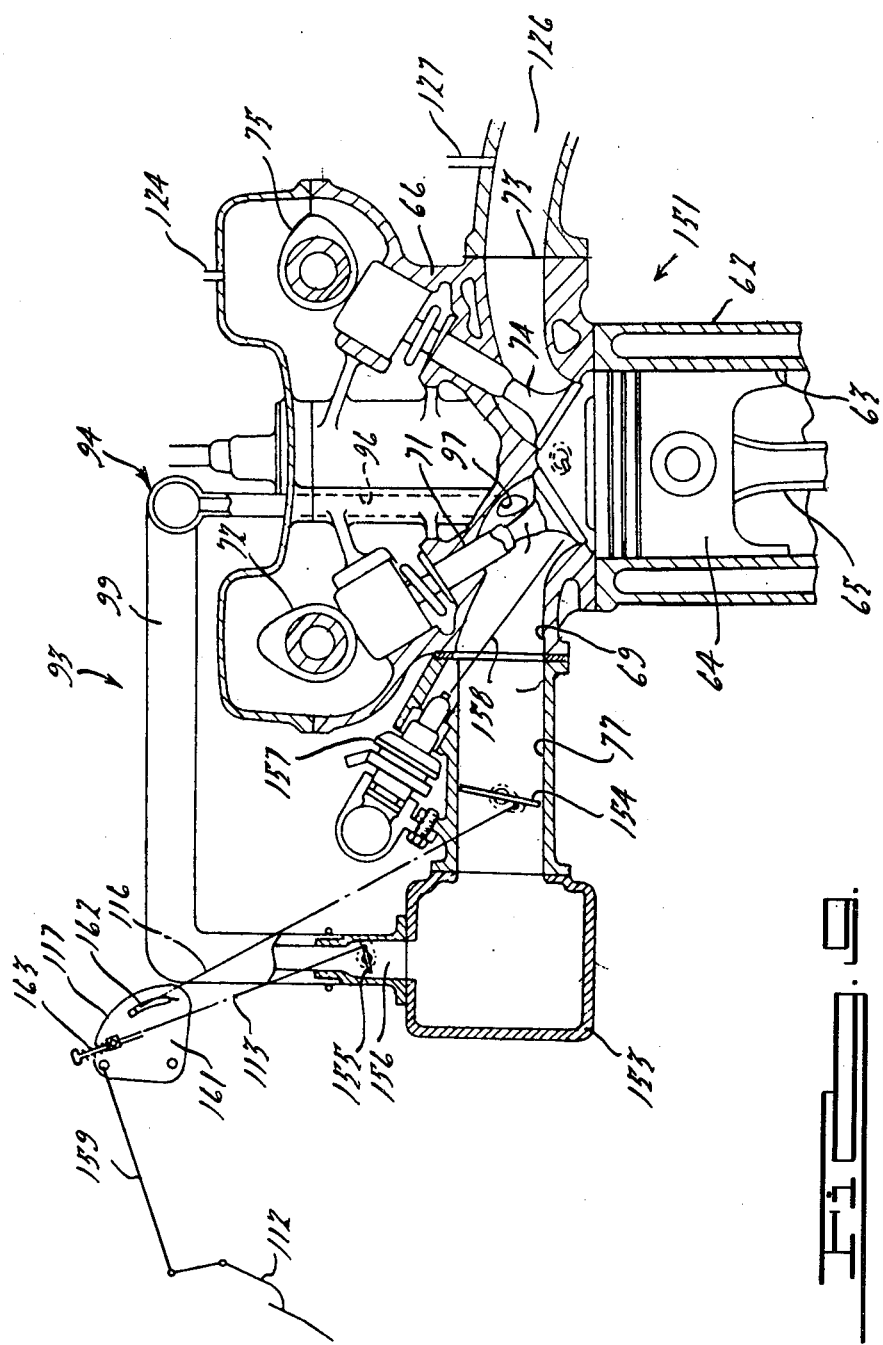

INTERNAL COMBUSTION ENGINE

This application is a continuation-in-part of our earlier application Ser. No. 854,260, filed Nov. 23, 1977, which is now abandoned and which a continuation thereof was filed on Jan. 25, 1980, under Ser. No. 115,414, and a continuation-in-part of our earlier application Ser. No. 839,360, filed Oct. 4, 1977, which is now abandoned and which a continuation thereof was filed on Mar. 23, 1978, under Ser. No. 889,300, now abandoned, and filed as a continuation under Ser. No. 65,427 on Aug. 10, 1979.

BACKGROUND OF THE INVENTION

This invention relates to an internal combustion engine and more particularly to an internal combustion engine that has improved idle and low speed running characteristics.

As is well known, the internal combustion engines of an automobile are required to run over a variety of conditions. Because of this, the performance over this range of conditions is frequently a compromise resulting in unsatisfactory performance under certain conditions. One of the more difficult conditions is idle and low load. During this condition, the induction gases pass through the induction system at a relatively low velocity which causes fuel to condense on the internal surfaces of the engine which define the intake passage and which also causes uneven and rough combustion in the combustion chamber. A similar situation prevails at low load conditions. In order to overcome these effects, it has been common practice to run the engine richer than normal at low load and idle conditions. Such rich mixture, however, causes the emission of unwanted exhaust gases. In addition to this defect, such rich mixtures adversely effect the fuel economy of the engine under these running conditions.

It is, therefore, a principal object of this invention to provide an internal combustion engine having an improved induction system for idle and low speed operation.

It is another object of the invention to provide an internal combustion engine having improved idle and low speed running characteristics.

Various devices have been proposed for improving the low and idle running characteristics of the engine. Such devices have been found, however, to significantly add to the cost of the engine, adversely effect the performance under other conditions, or to increase either fuel economy or the emission of unwanted exhaust gas constituents.

SUMMARY OF THE INVENTION

A first feature of the invention is adapted to be embodied in an internal combustion engine having a variable volume chamber in which combustion occurs and a main intake passage communicating with said chamber through a main intake port for delivering of charge thereto. In connection with this feature of the invention, a sub-intake passage is provided that communicates with the chamber through a sub-intake port. The sub-intake passage has an effective cross-sectional area at the sub-intake port substantially less than the effective cross-sectional area of the main intake port for causing a given mass flow of charge through the sub-intake port to enter the chamber at a significantly greater velocity. The sub-intake port is oriented so that the charge introduced to the chamber through this port establishes a swirl in the chamber which is maintained during the compression stroke. Valve means control the ratio of communication of the ports with the chamber during a given cycle of operation.

Another feature of the invention is also adapted to be embodied in an internal combustion engine having a variable volume chamber in which combustion occurs and a main intake passage communicating with the chamber through a main intake port for delivering a charge therethrough. An intake valve cooperates with the intake port for controlling the communication between the main intake passage and chamber. In connection with this feature of the invention a sub-intake passage is provided that communicates with the main intake passage and the chamber through a sub-intake port. The sub-intake port is disposed contiguous to the intake valve on the upstream side of the main intake passage. The sub-intake port and the intake valve are so oriented that the charge entering the chamber from the sub-intake port is deflected by the intake valve into a swirling motion.

Another feature of this invention is also adapted to be embodied in an internal combustion engine having a variable volume chamber in which combustion occurs and a main intake passage communicating with the chamber through a main intake port for delivering a charge thereto. In connection with this feature of the invention, a sub-intake passage communicates with the chamber through a sub-intake port which sub-intake port has an effective cross-sectional area substantially less than the effective cross-sectional area of the main intake port for causing a given mass flow of charge through the sub-intake port to enter the chamber at a significantly greater velocity. The direction of the charge entering the chamber from the main intake port differs substantially from the direction of the charge entering the combustion chamber from the sub-intake port. A separate charge forming device is provided for each of the intake passages. Valve means control the ratio of the communication of the passages with the chamber during the given cycle of operation.

An even further feature of the invention is also adapted to be embodied in an internal combustion engine having a variable volume chamber in which combustion occurs and a main intake passage communicating with the chamber through a main intake port for delivering a charge thereto. The engine is adapted to be embodied in a vehicle which vehicle has an arrangement whereby noxious gases which are undesireable to discharge to the atmosphere directly without further treatment are collected. In connection with this further feature of the invention a sub-intake passage communicates with the chamber through a sub-intake port which has an effective cross-sectional area substantially less than the effective cross-sectional area of the main intake port for causing a given mass flow of charge through the sub-intake port to enter the chamber at a significantly greater velocity. Means are provided for delivering at least a portion of the collected noxious gases to the sub-intake passage for delivery to the chamber through the sub-intake port.

BRIEF DESCRIPTION OF THE DRAWINGS

FIG. 1 is a partial, vertical cross-sectional view taken through an internal combustion engine embodying this invention, showing certain of the components in a schematic fashion.

FIG. 2 is a cross-sectional view taken generally along the line 2—2 of FIG. 1 and shows the relationship of the sub-intake port to the intake valve.

FIG. 3 is a cross-sectional view taken along the line 3—3 of FIG. 2.

FIG. 4 is a cross-sectional view, in part similar to FIG. 1, showing another embodiment of the invention as applied to a fuel injected engine.

FIG. 5 is a vertical cross-sectional view, in part similar to FIGS. 1 and 4, showing a still further embodiment of the invention.

FIG. 7 is a perspective view showing a portion of the manifolding associated with the sub-intake system of the embodiment of FIGS. 5 and 6.

FIG. 8 is a diagramatic view showing the throttle valve timing and induction passage flow used in the embodiment of FIGS. 5 through 7.

FIG. 9 is a cross-sectional view, in part similar to FIGS. 1, 4 and 5, showing a still further embodiment of the invention.

DETAILED DESCRIPTION OF THE PREFERRED EMBODIMENTS

Embodiment of FIGS. 1 through 3

Figure 6:
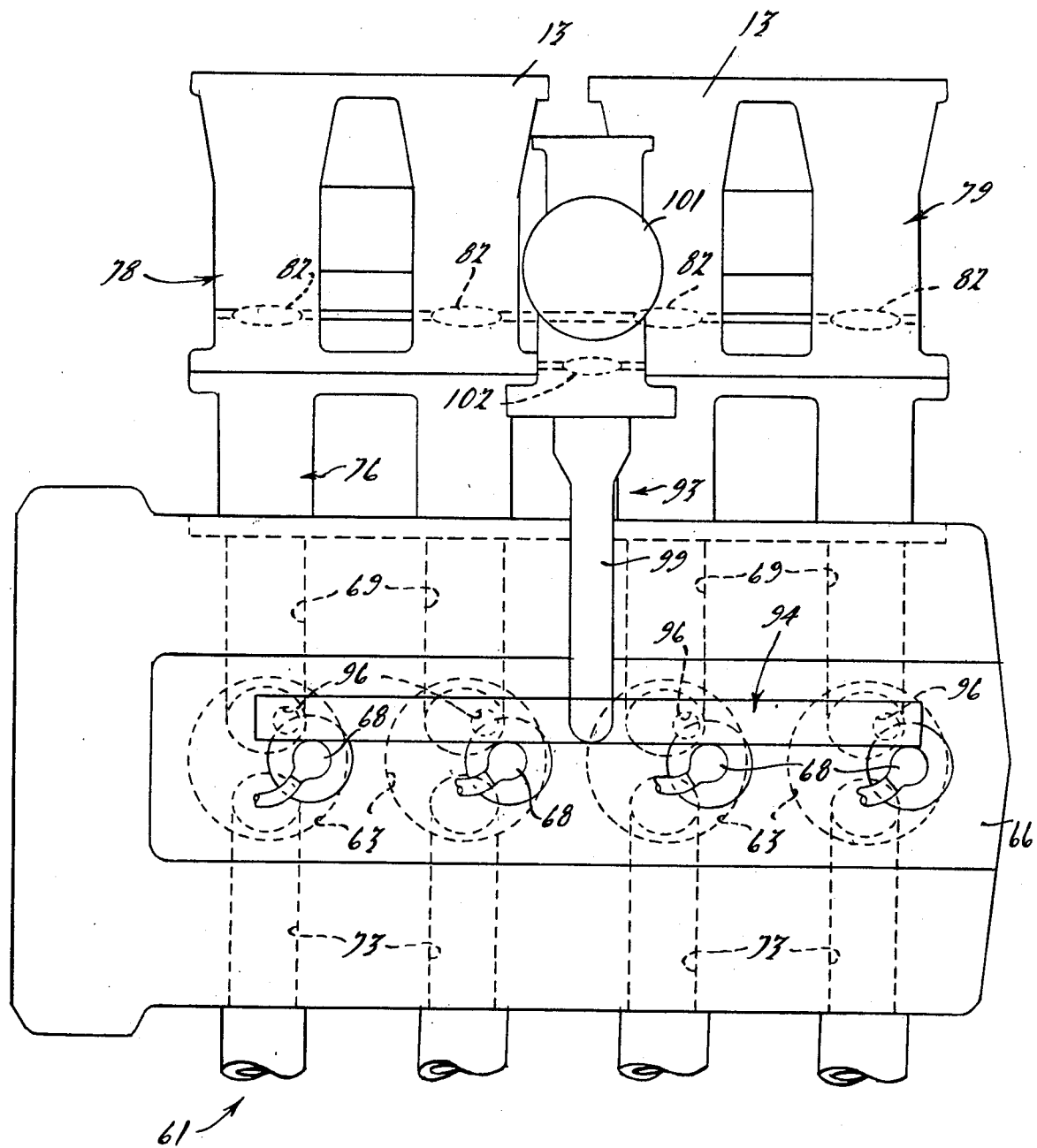
FIG. 6 is a top plan view of an engine constructed in accordance with the embodiment of FIG. 5.

FIGS. 1 through 3 illustrate a first embodiment of this invention as applied to a multiple cylinder engine, identified generally by the reference numeral 11. The engine 11 includes a cylinder block 12 having one or more cylinder bores 13 which respective pistons 14 are supported for reciprocation. Pistons 14 are, in a known manner, connected to drive an associated crankshaft by means of connecting rod assemblies or the like (not shown). A cylinder head 15 is affixed to the cylinder block 12 and defines with the piston 14 a combustion chamber 16, which in the described embodiment is of the dual hemispherical type. An intake port 17 extends through the cylinder head 15 and serves to deliver a charge to the combustion chamber 16. In a like manner, an exhaust passage 18 also extends through the cylinder head 15 and is adapted to receive the burnt charge from the combustion chamber 16. Intake and exhaust valves 19 and 21, respectively, cooperate to control the flow through the intake and exhaust passages 17 and 18 and specifically the ports formed at the termination of these passages. The intake and exhaust valves 19 and 21 are operated in any known manner, as by means including the overhead camshafts 22 and 23 respectively.

An intake manifold 24 is affixed, in any known manner, to the intake side of the cylinder head 15 and has an internal passage 25 which communicates with and forms an extension of the cylinder head intake passage 17. A main carburetor, indicated generally by the reference numeral 26 is supported upon the intake manifold 24 for delivering a charge of fuel air mixture to the main intake passage 17. The carburetor 26 includes a main venturi 27 that is positioned upstream of a main throttle valve 28 which throttle valve, as is well known, controls the flow through the carburetor 26 and induction passage 27. A boost venturi 29 is positioned adjacent the main venturi 27 for discharging a fuel air mixture into the induction passage 17 as is well known in the art. An air cleaner (not shown) is positioned at the inlet to the carburetor 26.

A spark plug 31 extends into the combustion chamber 16 for igniting the delivered fuel air mixture in the chamber 16 at or near the end of the compression stroke.

The construction of the engine 11 thus far described may be considered to be conventional and, for this reason, a detailed description has not been given. The piston 14 is provided with a raised central dome 32 that results in a surrounding squish area 33. The provision of a squish area tends to improve combustion by promoting a high degree of turbulence during the compression cycle which speeds flame propogation once the spark plug 31 has been fired.

In order to further improve the running of the engine, the fuel economy, and to reduce the emission of undesired exhaust gas constituents, particularly at idle and low RPM's, a sub-intake system, indicated generally by the reference numeral 34, is provided. As will become apparent, the sub-intake system 34 is constructed in such a way so as to increase the velocity of the charge in combustion chamber 16 during the entire intake and compression strokes, particularly immediately prior to combustion and to specifically induce a swirl to the intake charge which is maintained during the compression stroke and which has been found to improve running characteristics by speeding flame propogation during the expansion stroke.

The sub-intake system 34 includes a sub-intake pipe 35 that extends into the cylinder head 15 and terminates at a port 37 that is disposed within the main intake passage 17 and contiguous to the head 36 of the intake valve 19. As may be seen by FIGS. 2 and 3, the sub-intake port 37 formed at the termination of the pipe 35 is disposed to one side of the intake valve head 36. The pipe 35 is also disposed at an angle with respect to the portion of the main intake passage 17 at its discharge port so that the charge issuing from the sub-intake port 37 will be deflected by the valve head 36 and enter the chamber 16 at a different angle than the charge issuing from the main intake port 17.

The pipe 35 is fed from a manifold 38 a portion of which is surrounded by a cooling water heated riser 39. Upstream of the heat riser 39, a sub-carburetor 41 is provided for supplying a fuel air charge to the sub-intake system 34. A throttle valve 42 controls the flow through the sub-intake system 34. An air cleaner (not shown) is provided for filtering the air flowing into the sub-carburetor 41.

The throttle valves 28 and 42 of the main carburetor 26 and sub-carburetor 41 are actuated by means of links, schematically indicated at 43 and 44, respectively. The links 43 and 44 are interconnected by means of a motion transmitting mechanism which is illustrated only schematically and which is identified generally by the reference numeral 45. An accelerator pedal 46 is connected to links 43 and 44 through the motion transmitting mechanism 45. The construction of the motion transmitting mechanism 45 is such that the opening of the throttle valves 28 and 42 is generally sequential so that the throttle valve 42 of the sub-carburetor 41 is opened prior to the opening of the main throttle valve 28. Preferably, the main throttle valve 28 does not begin to open until the sub-throttle valve 42 is at or nearly at its wide opened throttle position. The motion transmitting mechanism 45 also includes a structure for permitting opening of the throttle valve 28 to its fully opened position after the throttle valve 42 has reached its fully opened position.

The sub-intake system 34 is sized relative to the main induction system comprising the intake passages 17 so that a given mass flow rate of charge flowing through the sub-intake port 37 will enter the chamber 16 at a substantially higher velocity than the charge issuing from the main intake port at the termination of the intake passage 17. In addition, the port 37 is directed so that the intake charge from the sub-intake system 37 is introduced in a swirling fashion, as indicated by the arrow 47 in FIG. 3. This swirling motion is achieved by deflection of the intake charge by the head 36 of the intake valve 19, as previously described. Preferably, the swirling direction 47 is substantially tangent to the combustion chamber 16 and cylinder bore so that this swirl will be maintained not only during the intake cycle but also during the compression cycle. It has been found that this swirling motion has the effect of promoting turbulence in the combustion chamber 16 once the spark plug 31 is fired and causes a highly rapid and yet stabilized propogation of the flame front through the combustion chamber 16. This result is achieved without diminishing the volumetric efficiency of the engine, particularly at high loads since the small cross-sectional area of the sub-intake passages 34 only provides the major portion of the charge at idle and low load conditions. In a preferred embodiment of the invention, the passages are sized so that the rate of swirl in the combustion chamber 16 generated by the sub-intake system 34 at idle and low load conditions is in the range of 4,000 to 6,000 RPM, more preferably in excess of or equal to 5,000 RPM. These characteristics are found with a cylinder bore 13 having a diameter of 84 millimeters.

Although in the described embodiment of FIGS. 1 through 3 the swirl generated by the sub-intake system 34 is achieved through cooperation of the positioning of the ports 37 relative to the valve head 36, it is to be understood that this result may also be achieved by directing the discharge portion of the pipe 35 so that the charge entering the chamber 16 from this pipe flows in a generally circumferential direction.

It is also to be understood that the rate of swirl induced by the sub-intake system 34 may be suitably adjusted by sizing of the respective induction passages and/or by control of the initial setting positions of the throttle valves 28 and 42.

Embodiment of FIG. 4

Another embodiment of the invention is illustrated in FIG. 4 and is identified generally by the reference numeral 51. The embodiment of FIG. 4 is similar to the embodiments of FIGS. 1 through 3 and for that reason common components have been identified by the same reference numeral and will not be described again. The principal difference between the embodiment of FIG. 4 and the previously described embodiments is that the embodiment of FIG. 4 employs a fuel injection system for delivering the charge to the combustion chamber 16 rather than carburetors as in the previously described embodiment.

A fuel injection nozzle 52 is supported within the cylinder head 15 and is disposed so that its outlet sprayed pattern, indicated by the dotted arc 53 is directed toward the head 36 of the intake valve 19. As such, the discharge spray 53 from the injection nozzle 52 will be intersected by the sub-intake pipe 35 and more specifically the discharge of the charge from the sub-intake pipe discharge port 37 will intersect, at an angle, the discharge from the fuel injection nozzle 52.

Connected to the outer end of the intake port 17 is a throttle body 54 in which a throttle valve 55 is positioned. The throttle valve 55 performs the same function as the throttle valve in the previously described embodiment, that being the controlling of the mass flow rate through the main intake passage 17. As in the previously described embodiment, the throttle valve 52 is controlled by the link 43.

Because of the incorporation of fuel injection, no fuel is delivered to the sub-intake system 34. For that reason, no heat riser is employed in this embodiment. A throttle body 56 is positioned at the inlet end of the sub-intake manifold 38 and supports a throttle valve 57 which is controlled by the link 44 as in the previously described embodiment.

The operation of the embodiment of FIG. 4 is substantially the same as the operation of the previously described embodiment of FIGS. 1 through 3. Fuel is injected by the nozzle 52 in a predetermined manner by any known rate, for example in accordance with the pressure in the intake passage 17 downstream of the throttle valve 55, which pressure is also controlled by the pressure in the sub-intake passage 34 as governed by the position of the throttle valve 57. At idle and low speed operation, the major portion of the air for the intake is supplied by the sub-intake system 34, introducing the high rate of swirl as previously described. In addition to the previously described functions, in connection with this embodiment the high velocity of the intake air will impinge upon the spray pattern 53 from the nozzle 52 and improve the fuel air mixture distribution within the combustion chamber 16. The sequence of opening of the throttle valves 55 and 57 can be as in the previously described embodiment and again the rate of swirl will be determined by the initial setting of these throttle valves and the sizing of the main intake passage 17 and that of the sub-intake system 34.

Embodiment of FIGS. 5 through 8

The embodiment of FIGS. 5 through 8 is similar to the embodiment of FIGS. 1 through 3. In this embodiment, however, the carburetion for the sub and main intake passages is altered so that appropriate carburetion may be provided for each of the respective passages. In this embodiment an arrangement also is provided for injecting certain undesireable gas discharge from portions of the engine or associated vehicle through the sub-intake passage for further treatment in the combustion chambers.

Referring now specifically to this embodiment, a multi-cylinder engine embodying these features as identified generally by the reference numeral 61. The engine 61 includes a cylinder block 62 in which a plurality of cylinder bores 63 are formed. Pistons 64 are slidably supported in the cylinder bores and drive a crankshaft (not shown) through connecting rods 65.

A cylinder head 66 is affixed to the cylinder block 62 and defines with the respective cylinder bore 63 and piston 64 a chamber 67 of variable volume in which combustion occurs. The mixture which is drawn into the chamber 67 is fired by means of a spark plug 68.

An intake passage 69 is formed in the cylinder head 66 for each of the cylinder bores 63. Each intake passage 69 terminates at a main intake port, the flow through which is controlled by an intake valve 71. The valves 71 are operated in any suitable manner, by means of an overhead camshaft 72.

An exhaust passage 73 is also formed in the cylinder head 66 for each cylinder bores 63. The flow through each exhaust passage 73 is controlled by means of a respective exhaust valve 74 which cooperates with an exhaust port formed at the termination of the exhaust passage 73 with the combustion chamber 67. Each exhaust valve 74 is also driven by means of an overhead mounted camshaft 75.

An intake manifold, indicated generally by the reference numeral 76, is affixed to the intake side of the cylinder head 66 and has a plurality of intake passages 77 each of which communicate with a respective cylinder head intake passage 69. Affixed to the intake manifold 76 is a pair of carburetors 78 and 79, each of which is identical in construction. For this reason, only one of these carburetors will be described in detail. The carburetors 78 and 79 are of the dual venturi type and each venturi of each carburetor is also identical in construction. In this way, an individual venturi serves each cylinder 63 of the engine 61.

The construction of these venturis and the associated fuel supply system may be best understood by reference to FIG. 5. In describing the venturi and fuel supply system for the carburetor 78, it is to be understood that this description applies to each venturi of each of the carburetors 78 and 79.

The carburetor 78 has a main venturi section 81 that is positioned upstream of a throttle valve 82. Contiguous to the upstream side of the main venturi 81 is a combined boost venturi and discharge nozzle 83 having a port 84 that receives fuel in a known manner from a fuel bowl 87. In addition to the main fuel discharge, the carburetor 78 is provided with a medium load fuel discharge 88, which is also supplied with fuel from the fuel bowl 87 in a known manner. The carburetor 78 also has an accelerating pump which is operated by an accelerating pump lever 89 and which discharges from an accelerating pump nozzle 91 by means including a passage 92. It should be noted that, except for the fact that the carburetor 78 has no idle or off idle fuel discharge system, it is otherwise conventional.

In addition to the main intake system described, the engine 61 also has a sub-intake system, indicated generally by the reference numeral 93, as with the previously described embodiments. The sub-intake system 93 includes a sub-intake manifold 94 (shown in most detail in FIG. 7) which has a plurality of outlet branches 95, each of which cooperates with a respective cylinder 63 of the engine 61. Branches 95 communicate with sub-intake passages 96 formed in the cylinder head 66 each of which terminates in a respective sub-intake port 97 that is disposed in communication with the main intake passage 69 contiguous to the head of the intake valve 71. It will be noted that the sub-intake passages 96 and ports 97 are disposed at an angle relative to the main intake passage 69. Because of the smaller cross-sectional area of the ports 97, a given mass flow rate flowing through of these ports will be ejected at a much higher velocity than the same mass flow through the main intake passage 69.

The sub-intake manifold 94 has a single inlet branch 98 which communicates through an intake pipe 99 with a sub-carburetor, indicated generally by the reference numeral 101. Thus, while individual venturies of the carburetors 78 and 79 serve each of the main intake ports 69, one sub-carburetor 101 serves all of the sub-intake passages 96.

The sub-carburetor 101 is designed primarily to serve the idle and low speed running of the engine 61. For this purpose, the sub-carburetor 101 has a throttle valve 102 that is positioned at the downstream side of a restricted venturi section 103. Downstream of the throttle valve 102 the sub-carburetor is provided with an idle discharge port 104. Contiguous to the idle position of the throttle valve 102 slow speed ports 105 are provided. Ports 104 and 105 receive a fuel air mixture from a float bowl 106 of the sub-carburetor 101 in known manner. A main discharge port 107 is also provided at the venturi section 103, which also receives fuel from the fuel bowl 106 in a known manner.

The sub-carburetor 101 also includes an accelerating pump that is operated by an accelerating pump lever 108 which discharges through an accelerating pump discharge 109 in a known manner.

A choke valve 111 is rotatably positioned in the sub-carburetor 101 upstream of the venturi 103. The choke valve 111 may be operated in any known manner, either automatically or manually.

The throttle valve 102 of the sub-carburetor 101 and the throttle valves 82 of the main carburetors 78 and 79 are operated sequentially through a linkage system, now to be described, from an accelerator pedal, indicated schematically at 112. The accelerator pedal 112 is connected by a link or main wire 113 to an actuating lever 114 that is connected to the sub-carburetor throttle valve 102 for actuating this throttle valve. Means including an overload spring 115 also connect the main wire 113 to the accelerating pump lever 108 so as to operate the accelerating pump of the sub-carburetor 101 upon opening movement of the throttle valve 102. The main actuating wire 113 is connected to an actuating wire 116 by means including a connection 117 that incorporates lost motion so that the throttle valve 102 may open before the throttle valves 82 and also which will permit continued full opening of the throttle valves 82 once the throttle valve 102 of the sub-carburetor 101 is in its fully opened position. The wire 116 is connected to actuating levers 118 that are affixed to the respective main throttle valves 82 and by means of an overload spring arrangement 119 to the respective accelerating pump levers 89 for operating the accelerating pumps of the carburetors 78 and 79 upon opening movement of the throttle valves 82.

As has been noted, the linkage for operating the throttle valve 102 of the sub-carburetor 101 and the throttle valves 82 of the main carburetors 78 and 79 are staged so as to provide a sequential opening of these throttle valves. The opening relationship is shown in the graphical illustration of FIG. 8. In this figure, the ordinate shows the load or speed of the engine from idle to full load. The abscissa indicates total mass flow through the induction system. The total flow is represented by the solid line curve 121. The flow through the sub-intake system is identified by the dotted line curve 122. The flow through the main induction passage is indicated by the solid line curve 123. It should be readily apparent that at idle and immediate off idle conditions, the main portion of the charge drawn into the combustion chambers 67 is delivered from the sub-intake system 93 and the sub-carburetor 101. Thus, under these conditions the intake charge is drawn in at a high velocity which improves turbulence in the combustion chamber and speeds flame propogation during these running characteristics. Also, due to the high velocity through the sub-intake passages of the system 93 the possibility of fuel condensation on these passages is minimized, thus insuring more uniform engine operation over a wide variety of temperatures.

As the load on the engine 61 increases, an increasing amount of the charge is supplied by the main induction system including the carburetors 78 and 79. It will be noted that at full load, nearly all of the charge is supplied by this portion of the induction system. Thus, the high velocity characteristics at the low and off idle conditions are achieved without any sacrifice in the breathing or volumetric efficiency of the engine. It is also to be noted that the fuel supply systems of the sub-carburetor 101 and main carburetors 78 and 79 are designed so as to provide the requisite fuel supply in relation to the air requirements of the respective induction systems.

It should also be noted that the choke valve 111 is provided only in the sub-carburetor 101. Thus, cold running characteristics of the engine are served solely by the sub-carburetor 101 further increasing the efficiency of the system and diminishing the pumping losses through the main intake system.

The engine 61 has a crankcase ventilating system terminating in an outlet passage 124 in which a valve, indicated schematically at 125 is provided. The details of such crankcase ventilating system are well known and will not be repeated here.

Affixed to the exhaust side of the cylinder head 66 is an exhaust manifold 126 in which exhaust gas recirculation port 127 is provided. It has been common practice to recycle a portion of the exhaust gases back through the induction system of the engine to reduce the emissions of nitrous oxides and to otherwise control the emission of unwanted exhaust gas constituents. In a like manner, it has also been the practice to return the crankcase ventilating gases to the induction system so as to reduce the emission of undesireable constituents to the atmosphere from the crankcase ventilating system.

In addition to the forenoted emission system controls (crankcase ventilation and exhaust gas recirculation) it has been a common practice to return the evaporative emissions from the fuel system (carburetor and fuel tank) to the engine induction system. The return of such gases to the engine induction system causes uneven burning, particularly at low loads, with the systems previously employed. In connection with this invention, such gases as may be controlled are returned to the induction system via the sub-intake system 93. Because these gases are, therefore, returned to the induction system at a high velocity it has been found that the previously experienced conditions of poor performance may be substantially minimized and, in fact, a greater amounts of such gases may be introduced to the combustion chambers.

Referring specifically to FIG. 7, the sub-intake manifold 94 has a port 128 that is adapted to be placed in communication with the crankcase ventilating system discharge 124 by means of an appropriate conduit (not shown). A port 129 of the manifold 94 is adapted to receive gases from the evaporative emission system by means of a suitable conduit, which is also not shown. A port 131 of the manifold 94 is adapted to receive the exhaust gases from the exhaust gas port 157 via a suitable conduit.

Figure 10:
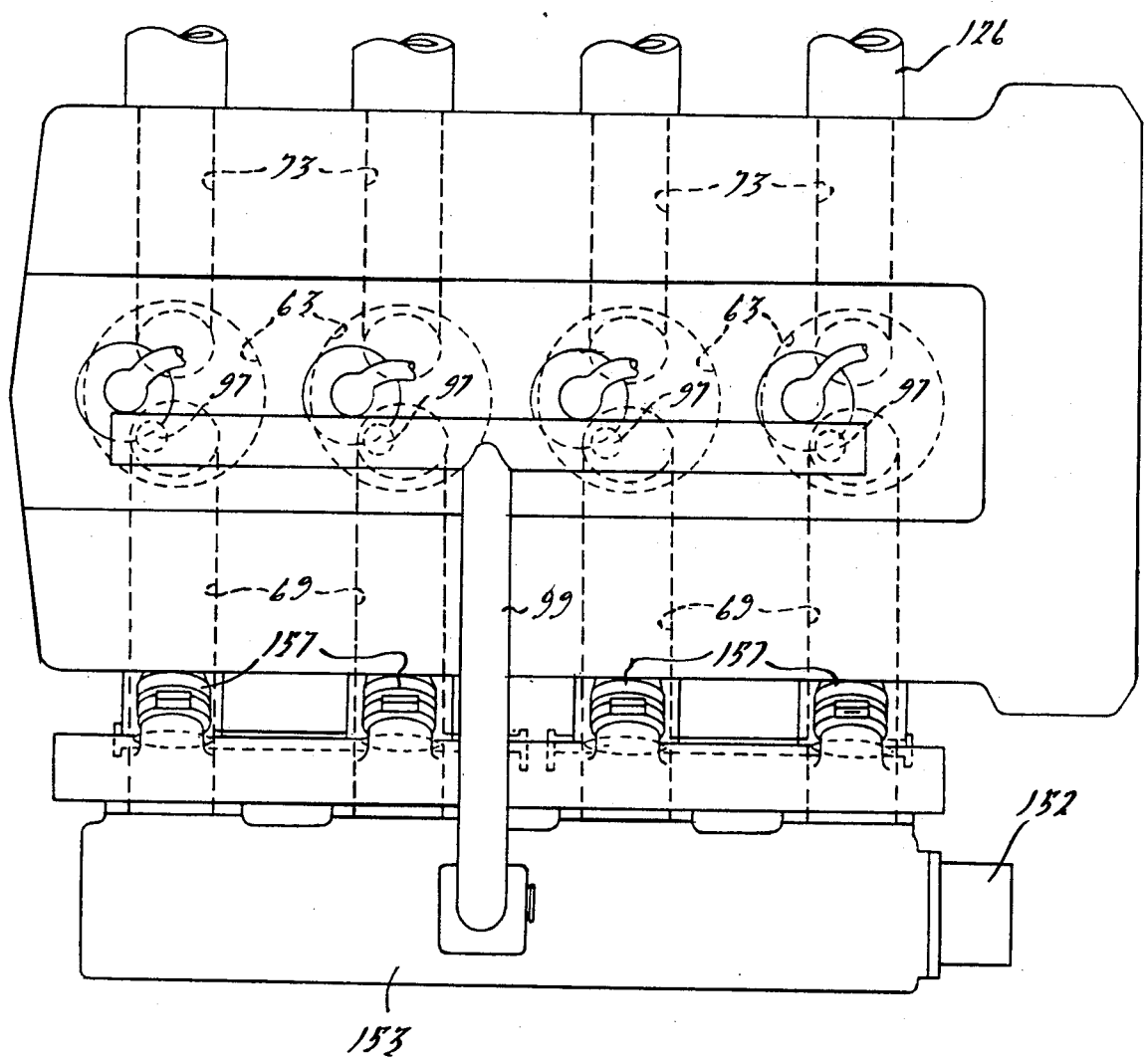
FIG. 10 is a top plan view of the embodiment shown in FIG. 9.

Embodiment of FIGS. 9 & 10

A multiple cylinder internal combustion engine incorporating a further embodiment of this invention is shown in FIGS. 9 and 10 and is identified generally by the reference number 151. The embodiment of FIGS. 9 and 10 is substantially the same as the embodiments of FIGS. 5 through 8, however, in this embodiment a fuel injection system replaces the carburetion system of the previously described embodiment. Because of these minor differences, only the portions of the engine 151 which differ from those of the previously described embodiment will be described in detail. Where components are identical in either construction and/or function to those of the embodiment of FIGS. 5 through 8, these components have been identified by the same reference numeral and will not be described again.

In connection with the engine 151 both the main induction system and the sub-induction system 93 are supplied with their intake air charge from a common air intake 152 that communicates with a plenum chamber 153. Control from the plenum chamber 153 to the main induction passages 69 is achieved by means of a throttle valve 154 positioned in each of the induction passages 77. Flow through the sub-intake system 93 is controlled by means of a single throttle valve 155 that is positioned in an outlet nipple 156 of the plenum 153.

A fuel injection nozzle 157 is provided for each of the intake passage 69, 77 and is supplied with fuel in any known manner. The spray pattern of discharge of the nozzle 157 is indicated by the dotted line arc 158 which, as in the embodiment of FIG. 4, is positioned to be intersected by the discharge of the high velocity charge from the sub-intake port 97 to add aid in mixture distribution.

FIGS. 9 and 10 illustrate the throttle linkage system in more detail than in the embodiment of FIGS. 5 through 8. For this reason, the linkage system will be described in some more detail. The accelerator pedal 112 is connected to the mechanism 117 by means of a link or cable 159. The mechanism 117 includes a bell crank 161 having a slot 162 that receives one end of the link or cable 116 that is coupled to the throttle valves 154. The cable 113 is connected to the bell crank 161 by means of an overload spring mechanism 163 so that full opening of the throttle valves 155 may occur before full opening of the throttle valves 154 and continued motion of the bell crank 161 is permitted to permit full opening of the throttle valves 154.

As should be apparent, operation of the accelerator pedal 112 causes the bell crank 161 to be pivoted in a counter-clockwise direction. Initial movement in this direction will cause the sub-throttle valve 155 to become opened while the end of the cable 116 traverses the lost motion slot 162. At a predetermined point, continued rotation of the bell crank 161 will cause opening movement of the throttle valves 154. At the point in time when the throttle valves 155 become fully opened, which occurs before full opening of the throttle valves 154, the bell crank 161 continues to move and overload spring 163 will yield.

SUMMARY

The linkage system for sequentially operating the throttle valve has been illustrated and described in detail only with respect to the embodiment of FIGS. 9 and 10. It is to be understood, however, that this same type of linkage system may be used with any of the other embodiments. Alternatively, any other suitable linkage system or motion transmitting mechanism may be employed to achieve the desired sequential actuation.

In the described embodiments the engines all employed individual throttle valves for each of the main intake ports. It is to be understood that a single throttle valve could be employed at a common point in the manifolding for the main induction system, as is employed in the sub-intake systems of the described embodiments.

When the term charge, when referring to the delivery to the respective combustion chambers or through the passages, is used in the specification and claims, this term is used to cover either a charge of pure air or a charge of air and fuel mixture. Also, the term charge forming device is used generically to describe either a carburetor or a fuel injection nozzle.

In addition to the described modifications, various other modifications may be made to the invention without departing from its spirit and scope, as defined by the appended claims.

We claim:

1. In an internal combustion engine having a variable volume chamber in which combustion occurs and a main intake passage communicating with said chamber through a main intake port for delivering a charge therethrough, the charged delivered to said chamber through said main intake port from said main intake passage being substantially unrestricted, the improvement comprising a sub-intake passage communicating with said combustion chamber through a sub-intake port, said sub-intake passage having an effective cross-sectional area substantially less than the effective cross-sectional area of said main intake passage for causing a given mass flow of charge through said sub-intake port to enter said chamber at a significantly greater velocity, said sub-intake port and said sub-intake passage being oriented so that its discharge is in a different direction than the discharge from said main intake passage and for effecting a swirl of the charge entering said chamber through said sub-intake port of sufficient magnitude to be maintained during the induction and compression strokes, and valve means for controlling the ratio of the communication of said ports with said chamber during a given cycle operation of said engine, said valve means being effective to cause a substantial portion of the load requirements of the chamber to be supplied through one of said intake passages at a certain running condition so that the flow generated by that passage predominates the flow pattern in said chamber during that running condition and a substantial portion of the charge requirements of the chamber at another running condition to be supplied through the other of said intake passages so that the flow generated by that intake passage predominates the flow pattern in said chamber during that other running condition.

2. An internal combustion engine as set forth in claim 1 wherein the passages are sized and the valve means arranged so that the swirl rate induced by the sub-intake passage is at least 5,000 RPM.

3. An internal combustion engine as set forth in claim 1 wherein the valve means comprise throttle valve means for causing substantially all of the engine idle and low load charge to be supplied through the sub-intake passage and substantially all of the full load charge to be supplied by the main intake passage.

4. An internal combustion engine as set forth in claim 1 wherein the valve means comprise throttle valve means in the main induction passage and sub-throttle valve means in the sub-intake passage.

5. An internal combustion engine as set forth in claim 4 further including actuating means for effecting initial opening of the sub-throttle valve means prior to initial opening of the main throttle valve means and for full opening of the sub-throttle valve means prior to full opening of the main throttle valve means for supplying substantially all of the engine charge requirements during idle and slow speed operation by said sub-intake passage and substantially all of the engine full load charge requirements by said main intake passage.

6. An internal combustion engine as set forth in claim 1 further including a charge forming device in at least one of the passages for introducing fuel thereto.

7. An internal combustion engine as set forth in claim 6 wherein a charge forming device is provided in both passages for introducing a charge to each of the main intake passage and the sub-intake passage.

8. An internal combustion engine as set forth in claim 6 wherein the valve means comprise throttle valve means for causing substantially all of the engine idle and low load charge to be supplied through the sub-intake passage and substantially all of the full load charge to be supplied by the main intake passage.

9. An internal combustion engine as set forth in claim 6 wherein the charge forming device comprises a fuel injection nozzle.

10. An internal combustion engine as set forth in claim 9 wherein the fuel injection nozzle delivers its charge to the main induction passage, the path of discharge from said fuel injection nozzle being intersected by the path of flow of charge from said sub-intake port for aiding in the dispersal and mixture of the fuel air entering said chamber.

11. An internal combustion engine as set forth in claim 7 wherein the charge forming device in the sub-intake passage only is provided with a cold starting device.

12. An internal combustion engine as set forth in claim 11 wherein the charge forming devices are both carburetors.

13. An internal combustion engine as set forth in claim 12 wherein the cold starting device comprises a choke valve.

14. An internal combustion engine as set forth in claim 7 wherein the charge forming device of the sub-intake passage provides the fuel air requirements of the engine at certain load ranges only and the charge forming device of the main intake passage provides the fuel air requirements of the engine at other load ranges.

15. An internal combustion engine as set forth in claim 7 wherein the engine has a plurality of chambers, main intake passages and sub-intake passages as defined there being one charge forming device for each of said main intake passages.

16. An internal combustion engine as set forth in claim 15 wherein there is one charge forming device which serves all of the sub-intake passages.

17. An internal combustion engine as set forth in claim 15 wherein each of the main intake passage charge forming devices comprises a venturi of a carburetor.

18. An internal combustion engine as set forth in claim 1 further including an intake valve cooperating with said main intake port for controlling communication between the main intake passage and the chamber, said sub-intake port communicating with said main intake passage upstream of said intake valve, said sub-intake port being disposed relative to said intake valve for causing said intake valve to deflect the path of flow from said sub-intake port into said chamber into the swirling pattern.

19. In an internal combustion engine having a variable volume chamber in which combustion occurs and a main intake passage communicating with said chamber through a main intake port for delivering a charge thereto, the improvement comprises a sub-intake passage communicating with said combustion chamber through a sub-intake port, said sub-intake passage having an effective cross-sectional area at said sub-intake port substantially different than the effective cross-sectional area of said main intake port for causing a given mass flow charge through the smaller of said ports to enter said chamber at a significantly greater velocity, the direction of the charge entering said chamber from said main intake port differing substantially from the direction of the charge entering said chamber from said sub-intake port, a first charge forming device for delivering a fuel air mixture to said main induction passage, a second charge forming device for delivering a fuel air mixture to said sub-induction passage, and throttle valve means for controlling the ratio of the communication of said ports with said chamber during a given cycle of operation of said engine, said throttle valve means being effective to cause a substantial portion of the engine charge requirements to be supplied through the main intake passage at one load range so that the flow pattern generated by said main intake passage predominates the flow pattern in said chamber at the one load range and through the sub-intake passage at another load range so that the flow generated by the sub-intake passage predominates the flow pattern in said chamber at that other load range.

20. An internal combustion engine as set forth in claim 19 wherein the sub-intake port is the smaller of the ports, the valve means comprise throttle valve means for causing substantially all of the engine idle and low load charge to be supplied through the sub-intake passage and substantially all of the full load charge to be supplied by the main intake passage.

21. An internal combustion engine as set forth in claim 19 wherein the valve means comprise throttle valve means in the main induction passage and sub-throttle valve means in the sub-intake passage.

22. An internal combustion engine as set forth in claim 21 further including linkage means for effecting initial opening of the sub-throttle valve means prior to initial opening of the main throttle valve means and for full opening of the sub-throttle valve means prior to full opening of the main throttle valve means for supplying substantially all of the engine charge requirements during idle and slow speed operation by said sub-intake passage and substantially all of the engine full load charge requirements by said main intake passage.

23. An internal combustion engine as set forth in claim 22 wherein the charge forming device in the sub-intake passage only is provided with a cold starting device.

24. An internal combustion engine as set forth in claim 23 wherein the charge forming devices are both carburetors.

25. An internal combustion engine as set forth in claim 24 wherein the cold starting device comprises a choke valve.

26. An internal combustion engine as set forth in claim 19 wherein the charge forming device of the sub-intake passage provides the fuel air requirements of the engine at certain load ranges only and the charge forming device of the main intake passage provides the fuel air requirements of the engine at other load ranges.

27. An internal combustion engine as set forth in claim 22 wherein the charge forming device of the sub-intake passage provides the fuel air requirements of the engine at idle and slow speed only and the charge forming device of the main intake passage provides the fuel air requirements of the engine at other load ranges.

28. A multi-cylinder internal combustion engine having a plurality of cylinders, each having a combustion chamber and an intake valve, said engine comprising a main intake passage common to at least two cylinders and comprising an inlet and at least two main branch intake passages branched off from said main intake passage, each of said main branch intake passages being connected to the respective combustion chamber via the corresponding intake valve; main fuel supply means arranged in the inlet of said main intake passage; an auxiliary intake passage common to said two cylinders and comprising an inlet and at least two auxiliary branch intake passages branched off from said auxiliary intake passage, each of said auxiliary branch intake passages having an outlet which opens into the respective main branch passage at a place near the valve gap formed between the corresponding intake valve and a valve seat thereof when the intake valve is open, the outlet being directed in the circumferential direction of the corresponding combustion chamber; auxiliary fuel supply means arranged in the inlet of said auxiliary intake passage; primary valve means arranged in said auxiliary intake passage and opened in accordance with increase in level of the load of an engine; and secondary valve means arranged in said main branch intake passages and operatively connected to said primary valve means for opening said secondary valve means after the opening degree of said primary valve means is increased beyond a predetermined opening degree.

29. A multi-cylinder internal combustion engine as claimed in claim 28 wherein each of said auxiliary branch intake passages has a cross-section which is smaller than that of said main branch intake passage.

30. A multi-cylinder internal combustion engine as claimed in claim 28, wherein said auxiliary intake passage has a cross-section which is smaller than that of said main intake passage.

31. A multi-cylinder internal combustion engine as claimed in claim 28, wherein said primary valve means comprises at least one primary throttle valve.

32. A multi-cylinder internal combustion engine as claimed in claim 31, wherein said auxiliary intake passage has an inner wall forming thereon an idle fuel port and a slow fuel port in the vicinity of said primary intake valve, said idle fuel port and said slow fuel port cooperating with said primary throttle valve.

33. A multi-cylinder internal combustion engine as claimed in claim 28, wherein said secondary valve means comprises at least two secondary throttle valves, each being arranged in the respective main branch intake passages.

34. A multi-cylinder internal combustion engine as claimed in claim 33, wherein said secondary throttle valves are fixed onto a common throttle shaft.

35. A multi-cylinder internal combustion engine as claimed in claim 28, wherein said engine further comprises link means mechanically interconnecting said primary valve means with said secondary valve means for opening said secondary valve means after the opening degree of said primary valve means is increased beyond a predetermined opening degree.

36. A multi-cylinder internal combustion engine as claimed in claim 35, wherein said link means comprises a rotatable first arm connected to said primary valve means, a rotatable second arm connected to said secondary valve means, a link interconnecting said first arm with said second arm and a rotatable level rotated in accordance with the increase in the level of the load of an engine and being arranged to be engagable with said first arm.

37. A multi-cylinder internal combustion engine as claimed in claim 28, wherein said main fuel supply means comprises a carburetor.

38. A multi-cylinder internal combustion engine as claimed in claim 28, wherein said auxiliary fuel supply means comprises a carburetor.

39. A multi-cylinder internal combustion engine having a plurality of cylinders, each having a combustion chamber and an intake valve, said engine comprising a main intake passage common to at least two cylinders and comprising an inlet and at least two main branch intake passages branched off from said main intake passage, each of said main branch intake passages being connected to the respective combustion chamber bia the corresponding intake valve; main fuel supply means arranged in the inlet of said main intake passage; an auxiliary intake passage common to said two cylinders and comprising an inlet and at least two auxiliary branch intake passages branched off from said auxiliary intake passage, each of said auxiliary branch intake passages having an outlet which opens into the respective main branch passage at a place near the valve gap formed between the corresponding intake valve and a valve seat thereof when the intake valve is open, the outlet being directed in the circumferential direction of the corresponding combustion chamber; auxiliary fuel supply means arranged in the inlet of said auxiliary intake passage; primary valve means arranged in said auxiliary intake passage and opened in accordance with increase in level of the load of an engine; and secondary valve means having at least two secondary throttle valves, which valves are mechanically connected and disposed in respective main branch intake passages near the respectively corresponding intake valves.

40. A multi-cylinder internal combustion engine as claimed in claim 39, wherein said engine further comprises link means mechanically interconnecting said primary valve means with said secondary valve means for opening said secondary valve means after the opening degree of said primary valve means in increased beyond a predetermined opening degree.

41. A multi-cylinder internal combustion engine having a plurality of cylinders, each having a combustion chamber and an intake valve, said engine comprising a main intake passage common to at least two cylinders and comprising an inlet and at least two main branch intake passages branched off from said main intake passage branched off from said main intake passage, each of said main branch intake passages being connected to the respective combustion chamber via the corresponding intake valve, main fuel supply means arranged in the inlet of said main intake passage; an auxiliary intake passage having an inner wall forming therein an idle fuel port and a slow fuel port in the vicinity of a primary valve, said idle fuel port and said slow fuel port cooperating with said primary valve; auxiliary fuel supply means arranged in the inlet of said auxiliary intake passage; primary valve means arranged in said auxiliary intake passage having at least one primary throttle valve which is opened in accordance with increase in level of the load of an engine; and secondary valve means arranged in said main branch intake passages and operatively connected to said primary valve means for opening said secondary valve means after the opening degree of said primary valve means is increased beyond a predetermined opening degree.

42. A multi-cylinder internal combustion engine having a plurality of cylinders, each having a combustion chamber and an intake valve, said engine comprising a main intake passage comprising an inlet and main branch intake passage branched off from said main intake passage, each of said main branch intake passages being connected to the respective combustion chamber via the corresponding intake valve; main fuel supply means arranged in the inlet of said main intake passage; an auxiliary intake passage common to said two cylinders and comprising an inlet and at least two auxiliary branch intake passages branched off from said auxiliary intake passage, each of said auxiliary branch intake passages having an outlet which opens into the respective main branch passage at a place near the valve gap formed between the corresponding intake valve and a valve seat thereof when the intake valve is open, the outlet being directed in the circumferential direction of the corresponding combustion chamber; auxiliary fuel supply means arranged in the inlet of said auxiliary intake passage; primary valve means arranged in said auxiliary intake passage and opened in accordance with increase in level of the load of an engine; and secondary valve means arranged in said main branch intake passages and operatively connected to said primary valve means for opening said secondary valve means after the opening degree of said primary valve means is increased beyond a predetermined opening degree.

43. A multi-cylinder internal combustion engine as claimed in claim 42, wherein each of said auxiliary branch intake passages has a cross-section which is smaller than that of said main branch intake passage.

44. A multi-cylinder internal combustion engine as claimed in claim 42, wherein said auxiliary intake passage has a cross-section which is smaller than that of said main intake passage.

45. A multi-cylinder internal combustion engine as claimed in claim 42, wherein said primary valve means comprises at least one primary throttle valve.

46. A multi-cylinder internal combustion engine as claimed in claim 42, wherein said auxiliary intake passage has an inner wall forming thereon an idle fuel port and a slow fuel port in the vicinity of said primary intake valve, said idle fuel port and said slow fuel port cooperating with said primary throttle valve.

47. A multi-cylinder internal combustion engine as claimed in claim 42, wherein said secondary valve means comprises at least two secondary throttle valves, each being arranged in the respective main branch intake passages.

48. A multi-cylinder internal combustion engine as claimed in claim 47, wherein said secondary throttle valves are fixed onto a common throttle shaft.

49. A multi-cylinder internal combustion engine as claimed in claim 47, wherein said engine further comprises link means mechanically interconnecting said primary valve means with said secondary valve means for opening said secondary valve means after the opening degree of said primary valve means is increased beyond a predetermined opening degree.

50. A multi-cylinder internal combustion engine as claimed in claim 49, wherein said link means comprises a rotatable first arm connected to said primary valve means, a rotatable second arm connected to said secondary valve means, a link interconnecting said first arm with said second arm and a rotatable level rotated in accordance with the increase in the level of the load of an engine and being arranged to be engagable with said first arm.

51. A multi-cylinder internal combustion engine as claimed in claim 42, wherein said main fuel supply means comprises a carburetor.

52. A multi-cylinder internal combustion engine as claimed in claim 42, wherein said auxiliary fuel supply means comprises a carburetor.

53. A multi-cylinder internal combustion engine having a plurality of cylinders, each having a combustion chamber and an intake valve, said engine comprising a main intake passage comprising an inlet and main branch intake passage branched off from said main intake passage, each of said main branch intake passages being connected to the respective combustion chamber via the corresponding intake valve; main fuel supply means arranged in the inlet of said main intake passage; an auxiliary intake passage common to said two cylinders and comprising an inlet and at least two auxiliary branch intake passages branched off from said auxiliary intake passage, each of said auxiliary branch intake passages having an outlet which opens into the respective main branch passage at a place near the valve gap formed between the corresponding intake valve and a valve seat thereof when the intake valve is open, the outlet being directed in the circumferential direction of the corresponding combustion chamber; auxiliary fuel supply means arranged in the inlet of said auxiliary intake passage; primary valve means arranged in said auxiliary intake passage and opened in accordance with increase in level of the load of an engine; and secondary valve means having at least two secondary throttle valves, which valves are mechanically connected and disposed in respective main branch intake passages near the respectively corresponding intake valves.

54. A multi-cylinder internal combustion engine as claimed in claim 53, wherein said engine further comprises link means mechanically interconnecting said primary valve means with said secondary valve means for opening said secondary valve means after the opening degree of said primary valve means in increased beyond a predetermined opening degree.

55. A multi-cylinder internal combustion engine having a plurality of cylinders, each having a combustion chamber and an intake valve, said engine comprising a main intake passage comprising an inlet and main branch intake passage branched off from said main intake passage, each of said main branch intake passages being connected to the respective combustion chamber via the corresponding intake valve main fuel supply means arranged in the inlet of said main intake passage; an auxiliary intake passage having an inner wall forming therein an idle fuel port and a slow fuel port in the vicinity of a primary valve, said idle fuel port and said slow fuel port cooperating with said primary valve; auxiliary fuel supply means arranged in the inlet of said auxiliary intake passage; primary valve means arranged in said auxiliary intake passage having at least one primary throttle valve which is opened in accordance with increase in level of the load of an engine; and secondary valve means arranged in said main branch intake passages and operatively connected to said primary valve means for opening said secondary valve means after the opening degree of said primary valve means is increased beyond a predetermined opening degree.

* * * * *

UNITED STATES PATENT AND TRADEMARK OFFICE
CERTIFICATE OF CORRECTION

PATENT NO. : 4,449,505

DATED : May 22, 1984

INVENTOR(S) : Etsuhiro Tezuka, Koichiro Kaji, Toru Ichinose

It is certified that error appears in the above-identified patent and that said Letters Patent is hereby corrected as shown below:

Column 11, line 50,
    Delete "said" and substitute --each--.

Column 15, line 28, claim 39

Delete "bia" and substitute --via--.

Column 16, line 67, claim 49

Delete "47" and substitute --42--.

Column 18, line 13, claim 54

Delete "in" and substitute --is--.

Column 18, line 23, claim 55

Insert "," after --valve--.

Signed and Sealed this

Thirtieth Day of July 1985

[SEAL]

Attest:

DONALD J. QUIGG

*Attesting Officer*     *Acting Commissioner of Patents and Trademarks*